April 14, 1970 R. E. RESSEGUIE 3,506,194
THERMOSTATIC VACUUM VALVE AND BIMETAL ELEMENT THEREIN
Original Filed Nov. 14, 1966

INVENTOR.
Robert E. Resseguie
BY
J. C. Evans
ATTORNEY

# United States Patent Office 3,506,194
Patented Apr. 14, 1970

3,506,194
THERMOSTATIC VACUUM VALVE AND BIMETAL ELEMENT THEREIN
Robert E. Resseguie, Flint, Mich., assignor to General Motors Corporation, Detroit, Mich., a corporation of Delaware
Original application Nov. 14, 1966, Ser. No. 594,135. Divided and this application Jan. 31, 1969, Ser. No. 795,668
Int. Cl. G05d 23/08; G01k 5/62
U.S. Cl. 236—87        3 Claims

ABSTRACT OF THE DISCLOSURE

A thermostatic vacuum valve having an elongated bimetallic element in eliptical form within an enclosed chamber which forms part of a vacuum flow path. The bimetallic element directly regulates the flow of atmospheric air through a vent outlet in response to air temperature to modify the strength of raw vacuum supplied to the enclosed flow chamber.

---

This is a division of application Ser. No. 594,135, filed Nov. 14, 1966.

This invention relates to valves and more particularly to thermostatic valves for controlling vacuum and a special bimetal element adapted for but not necessarily limited to use in such valves.

A vacuum control valve actuated by a bimetal element is disclosed in the United States Patent No. 3,319,888 granted May 16, 1967 in the name of John E. Creager and which is entitled "Vacuum Operated Automotive Temperature Control System." The present invention pertains to an improvement over the valve assembly and also over the bimetal element as disclosed in that patent application.

An object of the present invention is to provide a thermostatically actuated valve capable of quickly sensing temperature changes and simultaneously effecting corresponding changes in vacuum controlled by the valve. Another object is to provide a temperature sensing element capable of fast response and operation free of frictional effects inimical to calibration.

A feature of the present invention is a therostatic valve having an elegoated or elliptical bimetal element confined in a protective body of the valve and adapted to control fluid flow through the latter. Another feature is a unitary elongated bimetal element which is adapted to flex with substantially no friction interference when subjected to a temperature change to which it is sensitive and quickly responsive.

These and other features of the invention will become apparent as the description proceeds.

Figure 1:
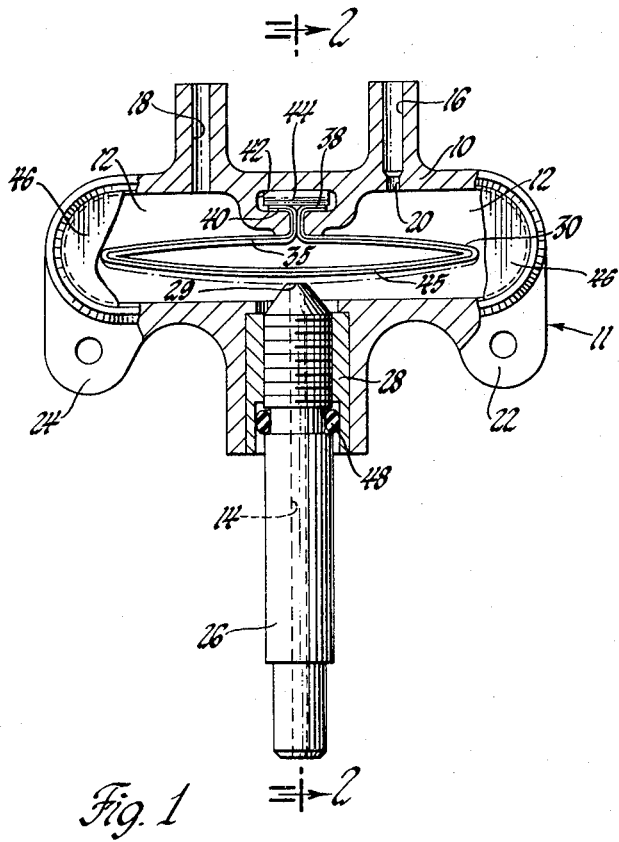
FIGURE 1 is a sectional view through a vacuum valve constituting one embodiment of the present invention.
Figure 2:
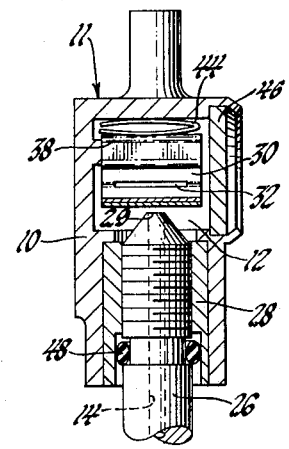
FIGURE 2 is a sectional view as seen looking in the direction fo the arrows 2—2 in FIGURE 1.

In the drawings, FIGURE 1 shows the body 10 of a valve broadly indicated at 11 and this body defines a fluid flow chamber 12 having a vent port 14 leading from the chamber to atmosphere and a pair of spaced inlet and outlet ports 16 and 18 constituting part of a vacuum line or path of flow. The port 16 is somewhat restricted at 20 to constitute an inlet to the valve 11 from a source of raw vacuum supply. The port 18 constitutes a port for vacuum modified or regulated in extent and in accordance with the operation of valve 11. The valve body 10 has two ears 22 and 24 by means of which the body may be supported on, for example, the fire wall of an automobile if the valve is to be used in controlling vacuum originating from the intake manifold of the automobile engine.

The vent port 14 constitutes an axial bore in a cylindrical member 26 which is held in threaded relation with respect to the body 10 and in a sleeve 28 tightly driven into the body. An interior vent outlet 29 of vent port 14 is formed on member 26 and is located within flow chamber 12.

Figure 3:
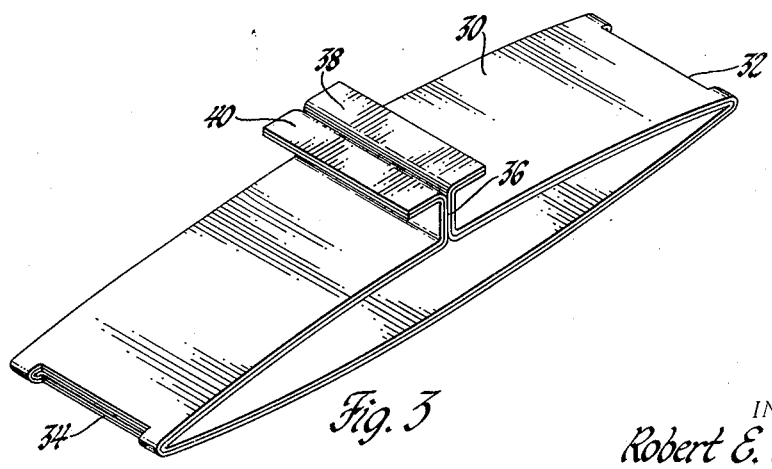
FIGURE 3 is an enlarged and prespective view of a bimetal element used in the valve assembly of FIGURES 1 and 2.

Protected within the body 10 is an elliptical bimetal element 30 of unitary construction. It is made of conventional bimetal materials; that is, two differing metals joined together in the flat form giving a laminar construction and then bent to the elliptical shape as most clearly shown in FIGURE 3. The ends of the element 30 bear cutouts 32 and 34 to facilitate flexibility of the element. It will be noted that the element is of unitary construction and that an intermediae portion of a long side 35 of that element shows a clevage as at 36 because that portion constitutes ends of the element (in the flat) and bears oppositely extending flanges 38 and 40 whereby the element may firmly be held with the aid of a small recess 42 formed in the body 10 and with a major portion of the element out of contact with the body.

In the particular embodiment of the valve shown, a C-shaped spring 44 is retained in the small recess 42 tightly to hold the flanges 38 and 40 in fixed position with respect to the body 10. It will be noted that, except for the intermediate supporting portion of the bimetal element 30, all other parts of the element are out of contact with the body 10 although, as will be seen as the description proceeds, another long side 45 of the bimetallic element is adapted to contact the end of the cylinder 26 and close the vent outlet 29 of vent port 14 when the proper temperature for that operation obtains. An insert 46 is locked in place at the back of the body 10 to seal the latter after the element 30 and spring 44 are in place.

Because of a threaded connection between the cylinder 26 and the body 10, the distance between the end of the vent port 14 and the element 30 may be varied. This constitutes a means for calibrating the valve—i.e.—predetermining the temperature at which the valve will open and close. A sealing ring 48 is interposed between the cylinder 26 and the sleeve 28.

In the operation of the valve 11, raw vacuum is supplied to the port 16 and, if the vent 14 is open, any vacuum at the port 18 will be relieved because of the admission of atmospheric air through the vent 14. If, however, the temperature of the air entering the vent varies sufficiently and rises such as to cause the element 30 to arch to its dot and dash position, as seen in FIGURE 1, the element itself will close the vent and the vacuum at the port 18 will be raised to a maximum extent. At intermediate positions of the bimetal element 30, the extent of vacuum in the port 18 will be modulated in accordance with the temperature of the small quantity of air admitted by way of the vent 14 and "washing" over the element 30.

While the bimetal element 30 is shown specifically for use in the vacuum valve 11, it should be appreciated that the field of use of the element 30 could encompass any application thereof wherein the flow of a fluid should be related to temperature to which the element is subjected. This elliptical one piece form of bimetal element represents a preferred construction but it will be appreciated that substantially or somewhat straight but long bimetal side pieces could be used with end spacers permitting a hinge action—all as a unitary but fabricated or built-up version to gain substantially the same effect—a sensitive device not influenced by friction. Such a modified construction would come within the purview of the present invention.

While the embodiment of the present invention as herein described constitutes a preferred form, it is to be understood that other forms may be adapted.

What is claimed is as follows:

1. A thermostatic vacuum valve comprising: a valve body having an interior space which defines a vacuum flow chamber; an inlet port through said valve body for communicating said flow chamber with a source of raw vacuum; an outlet port through said valve body for communicating said flow chamber with a vacuum motor; a vent outlet through said valve body for admitting air into said flow chamber from atmosphere; an elongated bimetal element in said chamber having two long sides spaced one from another and joined at their respective ends; flange means on one side of said valve element intermediate its joined ends for supporting said valve element within said flow chamber; said valve body having a recess for engaging said flange means to support said valve element and to reduce thermal conduction between the valve body and said valve element; the other side of said bimetal valve element having an intermediate portion overlying and spaced from said vent outlet when in an open operating position and against said vent outlet when in a closed operating position and whereby movement of said bimetal valve element in response to temperature of atmospheric air from said vent outlet causes said intermediate portion of the valve element to regulate the admission of air through said vent outlet into said flow chamber to modify the strength of raw vacuum supplied through said inlet port which produces a modified vacuum in said outlet port.

2. A thermostatic vacuum valve comprising: a valve body having an interior space which defines a vacuum flow chamber; an inlet port through said valve body for communicating said flow chamber with a source of raw vacuum; an outlet port through said valve body for communicating said flow chamber with a vacuum motor; a vent outlet through the valve body opposite said inlet and outlet ports for admitting air into said flow chamber from atmosphere; an elongated bimetal valve element in said chamber having two long sides spaced one from another and joined at their respective ends; said joined ends having cutouts which reduce friction and hysteresis when said long sides move with respect to one another caused by temperature change; support means on one side of said valve element intermediate its joined ends for supporting said valve element within said flow chamber; the other side of said bimetal valve element having an intermediate portion overlying and spaced from said vent outlet when in an open operating position and against said vent outlet when in a closed operating position; said vent outlet being in a cylindrical member which is adjustably supported through the valve body for varying the distance between the vent outlet and said intermediate portion of said bimetal valve element for calibration of said valve and whereby movement of said bimetal valve element in response to temperature of atmospheric air from said vent outlet causes said intermediate portion of the valve element to regulate the admission of air through a said vent outlet into said flow chamber to modify the strength of raw vacuum supplied through said inlet port which produces a modified vacuum in said outlet port.

3. A thermostatic vacuum valve comprising: a valve body having an interior space which defines a vacuum flow chamber; an inlet port through said valve body for communicating said flow chamber with a source of raw vacuum; an outlet port through said valve body opposite said inlet and outlet ports for communicating said flow chamber with a vacuum motor; a vent outlet through said valve body opposite said inlet and outlet ports for admitting air into said flow chamber from atmosphere; an elongated bimetal element in said chamber having two long sides spaced one from another and joined at their respective ends; said joined ends having cutouts which reduce friction and hysteresis when said long sides move with respect to one another caused by temperature change; flange means on one side of said valve element intermediate its joined ends for supporting said valve element within said flow chamber; said valve body having a recess for engaging said flange means to support said valve element and to reduce thermal conduction between the valve body and said valve element; the other side of said bimetal valve element having an intermediate portion overlying and spaced from said vent outlet when in an open operating position and against said vent outlet when in a closed operating position and whereby movement of said bimetal valve element in response to temperature of atmospheric air from said vent outlet causes said intermediate portion of the valve element to regulate the admission of air through said vent outlet into said flow chamber to modify the strength of raw vacuum supplied through said inlet port which produces a modified vacuum in said outlet port.

References Cited

UNITED STATES PATENTS

| 1,491,589 | 4/1924 | Dzus | 73—363.5 X |
| 2,677,501 | 5/1954 | Raymond et al. | 236—93 |
| 3,319,888 | 5/1967 | Creager | 236—87 |

WILLIAM E. WAYNER, Primary Examiner

U.S. Cl. X.R.

73—363.5; 236—101